United States Patent
Zeng et al.

(10) Patent No.: US 7,239,458 B2
(45) Date of Patent: Jul. 3, 2007

(54) IMAGE PICK-UP LENS SYSTEM

(75) Inventors: Ji-Yong Zeng, Beijing (CN); Guo-Fan Jin, Beijing (CN); Ying-Bai Yan, Beijing (CN); Zhuo Wang, Beijing (CN); Min-Qiang Wang, Beijing (CN)

(73) Assignees: Tsinghua University, Beijing (CN); Hon Hai Precision Industry Co., Ltd., Tu-cheng, Taipei Hsien (TW)

( * ) Notice: Subject to any disclaimer, the term of this patent is extended or adjusted under 35 U.S.C. 154(b) by 0 days.

(21) Appl. No.: 11/254,475

(22) Filed: Oct. 20, 2005

(65) Prior Publication Data

US 2006/0092529 A1    May 4, 2006

(30) Foreign Application Priority Data

Oct. 28, 2004   (CN) .................. 2004 1 0052033

(51) Int. Cl.
*G02B 9/00* (2006.01)
(52) U.S. Cl. .................. 359/784; 359/737; 359/719
(58) Field of Classification Search ................ 359/716, 359/719, 737, 754–757, 763, 765, 772
See application file for complete search history.

(56) References Cited

U.S. PATENT DOCUMENTS

| | | | |
|---|---|---|---|
| 6,055,105 A | | 4/2000 | Boku et al. |
| 6,191,889 B1* | | 2/2001 | Maruyama .................. 359/566 |
| 6,297,915 B1* | | 10/2001 | Kaneko et al. ............. 359/718 |
| 6,970,306 B2* | | 11/2005 | Matsuo ....................... 359/716 |
| 7,031,079 B2* | | 4/2006 | Isono .......................... 359/791 |
| 2003/0117709 A1 | | 6/2003 | Nakamura et al. |
| 2003/0117723 A1 | | 6/2003 | Shinohara |
| 2003/0193605 A1 | | 10/2003 | Yamaguchi |
| 2004/0036983 A1 | | 2/2004 | Ninomiya et al. |
| 2004/0150893 A1* | | 8/2004 | Shinohara ................... 359/785 |

FOREIGN PATENT DOCUMENTS

| | | |
|---|---|---|
| EP | 0819952 | 1/1998 |
| EP | 1357414 | 10/2003 |
| JP | 2001-075006 | 3/2001 |

\* cited by examiner

*Primary Examiner*—Scott J. Sugarman
*Assistant Examiner*—Darryl J. Collins
(74) *Attorney, Agent, or Firm*—Morris Manning & Martin LLP; Tim Tingkang Xiq, Esq.

(57) ABSTRACT

An image pick-up lens system includes an aperture stop (10), a biconvex first lens (20), a second lens (30) having a concave surface on an object side, and a third lens (40) having a concave surface on an image side. The aperture stop (10), the first lens (20), the second lens (30) and the third lens (40) are aligned in that order from the object side to the image side. All lenses in the system are made from a plastic or resin material, and one of them has a diffraction grating formed on a surface. The system satisfies conditions (1)-(5) as disclosed, in order to provide compactness, cost-effectiveness and improved optical performance.

18 Claims, 13 Drawing Sheets

IMAGE PICK-UP LENS SYSTEM

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in portable terminals such as mobile phones and laptop computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be mass manufactured and marketed. This is accelerating the demand for downsizing of image pick-up lens systems so that they are able to be suitably used with miniaturized image pickup devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following four main requirements:

First, a high brightness requirement, which means that the lens system should have a small F number (FNo.). Generally, the FNo. should be 2.8 or less.

Second, a wide angle requirement, which means that a half of a field of view of the lens system should be 30° or more.

Third, a uniform illumination over the image surface requirement, which means that the lens system can reduce or even avoid the occurrence of vignetting, thereby enhance illumination over edge portions of the image surface.

Fourth, a high resolution requirement, which means that the lens system should appropriately correct fundamental aberrations such as spherical aberration, coma aberration, curvature of field, astigmatism, distortion, and chromatic aberration.

In a single lens system which satisfies the low cost and lightweight requirement, the single lens of the system is generally made from a plastic. However, it is difficult for the single lens system to effectively correct chromatic aberration and achieve excellent optical performance, especially in the case where a wide angle of view of for example 70° is desired. Therefore, employment of a diffraction lens to correct chromatic aberration was proposed in an article entitled "Optical Design of Diffraction Lens System" (Yunguang Technology, Vol. 32, No. 2, 2000, pp. 33-39). In this article, a hybrid diffractive-refractive single lens system is employed to correct chromatic aberration. Other similar lens systems are disclosed in U.S. Pat. No. 6,055,105B1, U.S. Pat. Application Publication No. US2003/0117709A1, and EP Pat. No. 0819952A2. However, none of these lens systems can achieve excellent optical performance in the case of a wide angle of view. In addition, the distortion, field curvature and astigmatism of the lens systems cannot be effectively corrected.

Typical two-lens systems can be found in U.S. Pat. Application Publication Nos. 2003/0117723 and 2004/0036983, and EP Pat. No. 1357414A1. In order to correct chromatic aberration, two lenses are employed in the lens system. The two lenses must be made from different materials, with Abbe constants thereof differing significantly. The number of the glass/plastic lens(es) in the single lens system and the two-lens system is insufficient to correct the distortion, field curvature and astigmatism that typically occur in such lens systems. In other words, such lens systems generally cannot provide sufficiently excellent optical performance. The single lens system and two-lens system are generally used in a low-resolution image pickup device such as a CMOS.

In order to satisfy the excellent optical performance requirement, three lenses are generally employed. Three-lens systems can provide a wider angle of view and correct various aberrations. A three-lens system comprises, from an object side to an image side, an aperture stop, a first lens having positive focal power, a second lens having negative focal power, and a third lens having positive focal power. Typical three-lens systems can be found in U.S. Pat. Application Publication No. 2003/0193605A1, and Japanese Patent Publication No. 2001-075006. The lens system shortens the distance between the object side and the image side. The aperture stop is arranged between the object side and the first lens, for narrowing down an incident angle of chief rays being projected onto the image pick-up surface. In order to correct chromatic aberration, the lenses that have positive refracting power must be made from different materials, with the corresponding Abbe constants differing significantly.

In a lens system which satisfies the low cost requirement, all lenses of the three-lens system should be made from a plastic or a resin material. However, there are only a few varieties of plastic materials which can be suitably used to make lenses. Even if all the lenses are made from a different plastic or resin material, the range of variation of optical properties of the lenses is limited. This makes it difficult to effectively correct chromatic aberration. Another important consideration is that plastic materials are prone to absorb water. For example, the water absorbency of polymethyl methacrylate (PMMA) is 1.5%, and the water absorbency of polycarbonate (PC) is 0.4%. Among the plastic or resin materials which can be suitably used to make lenses, only zeonex materials (polyolefin resins or cyclo-olefin polymers) have relatively low water absorbency. In general, the water absorbency is less than 0.01%. Zeonex materials are available from the Japanese Zeon Corporation. Therefore unless a non-glass lens is made from a zeonex material, it is liable to absorb water and deform. As a result, the optical performance of the lens system is diminished.

Therefore, a low cost image pick-up lens system which has a compact size and excellent optical performance is desired.

SUMMARY

An image pick-up lens system comprises an aperture stop, a biconvex first lens, a second lens having a concave surface on an object side, and a third lens having a concave surface on an image side. The aperture stop, the first lens, the second lens and the third lens are aligned in that order from the object side to the image side. All the lenses in the system are made from a plastic or resin material, and one of them has a diffraction grating formed on a surface thereof.

The second lens and the third lens may be meniscus-shaped lenses. Preferably, the first lens and the second lens have positive refracting power, the third lens has negative refracting power. More preferably, the first lens has a diffraction grating formed on a convex surface on the image side.

According to a first aspect of the invention, in order to obtain a compact configuration, the following condition is satisfied:

$$1.4 < T/f < 1.8, \qquad (1)$$

wherein, f is a focal length of the system, and T is a length from the aperture stop to an image pick-up surface of the image side.

According to a second aspect, in order to correct monochromatic aberration and satisfy the compactness requirement, the following conditions are satisfied:

$$0.7 < f1/f < 1.2, \qquad (2)$$

wherein, f1 is a focal length of the first lens.

According to a third aspect, in order to correct off axis aberration, the following condition is satisfied:

$$-9 < f3/f < -1.7, \qquad (3)$$

wherein, f3 is a focal length of the third lens.

According to a fourth aspect, in order to correct field curvature, the following condition is satisfied:

$$-0.6 < R4/[f \times (n-1)] < -0.3, \qquad (4)$$

wherein, R4 is a radius of curvature of a third surface of the second lens on the object side, n is the refractive index of a material of the second lens, and $R4/[f \times (n-1)]$ is a ratio of a focal length of the third surface of the second lens on the object side to a focal length of the system.

Further, to correct chromatic aberration and make the lenses relatively easy to manufacture, the following condition is satisfied:

$$-470 < C_2 \times (f1/R_n^2) < -280, \qquad (5)$$

wherein, $C_2$ is the power phase coefficient of the phase function of the diffraction grating surface of the first lens, and $R_n$ is a normalization radius of the diffraction grating.

Preferably, at least one lens surface of all the lenses in the system is an aspheric surface. More preferably, each of the lenses has at least one aspheric surface. Even more preferably, each of the second lens and the third lens is aspheric on both surfaces thereof.

Further still, all lenses in the system are made from a same plastic or a same resin. The same plastic or the same resin is a zeonex material.

In the lens system, the first lens and the second lens have positive refracting power, the third lens has negative refracting power, the first lens, the second lens and the third lens are aligned in that order from the object side to an image side. This arrangement of the lenses in the system helps shorten a total length of the system, thus, a compact configuration is provided. In addition, because the lenses are made from a same plastic or a same resin, the manufacture cost and complication can be reduced. Especially, when the same plastic or the same resin is a zeonex material, thus, reduction of the optical performance of the lens system due to deformation of the lenses caused by absorbing water is prevented. Furthermore, with the diffraction grating formed on a surface of a lens of the system, the lens system can appropriately correct chromatic aberration and improve the optical performance of the lens system.

Other advantages and novel features will become more apparent from the following detailed description when taken in conjunction with the accompanying drawings, in which:

DETAILED DESCRIPTION OF THE EMBODIMENTS

The present invention is further described below and by reference to the figures.

Figure 1:
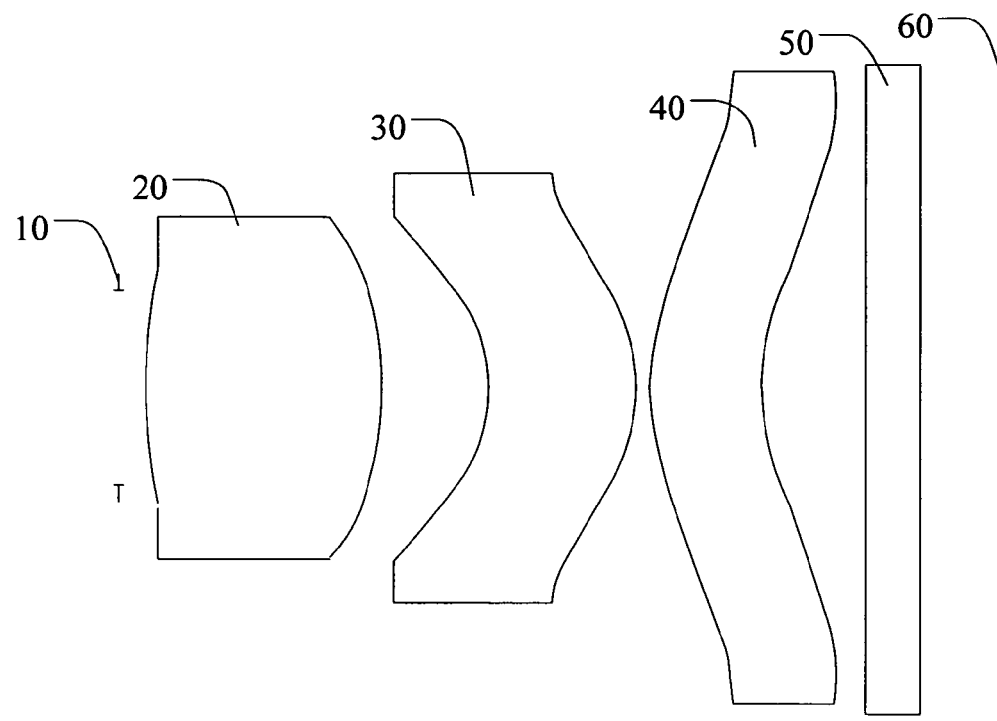
FIG. 1 is a schematic, cross-sectional view of an image pick-up lens system in accordance with a preferred embodiment of the present invention, and also shows a cover glass and an image pick-up surface.
Figure 2:
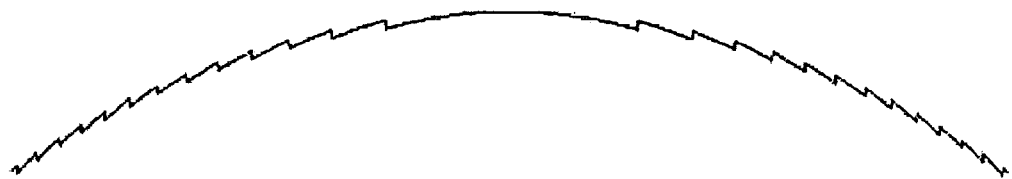
FIG. 2 is an enlarged, cross-sectional view of a diffraction grating on a convex surface of one lens of the lens system of FIG. 1.

FIG. 1 shows a schematic configuration of an image pick-up lens system (hereinafter, "lens system") according to a preferred embodiment of the present invention. Light beams from an object side of the system sequentially pass through an aperture stop 10, a biconvex first lens 20, a second lens 30, and a third lens 40. The first, second and third lens 20, 30, 40 are aligned in that order from the object side to an image side of the system, the image side being opposite to the object side. The second lens 30 has a concave surface facing the object side. The third lens 40 has a concave surface facing the image side. The second lens 30 and the third lens 40 are preferably meniscus-shaped. The light beams are then converged onto an image pick-up surface 60 of an image pickup device such as a CCD or a CMOS. Usually, a cover glass 50 is provided between the third lens 40 and the image pick-up surface 60. The first, second and third lenses 20, 30, 40 of the lens system are formed of essentially the same material, such as a plastic material. At least one of the first, second and third lenses 20, 30, 40 has a diffraction grating formed on a surface thereof. FIG. 2 shows a sectional view of the diffraction grating of such lens of the lens system.

In the illustrated embodiment, the first lens 20 and the second lens 30 have positive focal power, and the third lens 40 has negative focal power. The diffraction grating is formed on the convex surface of the first lens 20 that faces the image side.

Due to the first lens 20 and the second lens 30 having positive focal power and the third lens 40 having negative focal power, and due to the arrangement of the first, second and third lenses 20, 30, 40, a total length of the lens system may be significantly reduced compared with conventional lens systems.

In order to achieve compactness and excellent optical performance, the lens system satisfies the following condition:

$$1.4 < T/f < 1.8, \quad (1)$$

wherein, f is the focal length of the lens system, and T is the total length from the aperture stop 10 to the image pick-up surface 60 of the lens system. Condition (1) is for limiting the total length of the lens system. The total length of the lens system and the total T/f directly affect optical performance of the system. Under condition (1), the lens system may provide an improved optical performance, especially in cases where an emitting angle of the chief rays is required to be limited within a certain range, while still enabling the lens system to have a compact size.

Preferably, the first lens 20 satisfies the following conditions:

$$0.7 < f1/f < 1.2, \quad (2)$$

wherein, f1 is the focal length of the first lens 20, and f is the focal length of the lens system. Condition (2) is for correcting monochromatic aberrations, and limiting a focal power of the first lens 20. In one aspect, when the ratio f1/f is above the lower limit of 0.7, a radius of curvature of each surface of the first lens 20 is not unduly small, and the high-order spherical aberration, high-order coma and lateral chromatic aberration of the lens system may be kept within an appropriate range. In another aspect, when the ratio f1/f is below the upper limit of 1.2, the first lens 20 shares an appropriate proportion of the focal power of the lens system, while the total length of the lens system may also be lessened.

More preferably, the third lens 40 satisfies the following conditions:

$$-9 < f3/f < -1.7, \quad (3)$$

wherein, f3 is the focal length of the third lens 40, and f is the focal length of the lens system. Condition (3) is for limiting the focal power of the third lens 40. In one aspect, when the ratio f3/f is above the lower limit of −9, the third lens 40 has a negative focal power. This may help to correct off axis aberration. In another aspect, when the ratio f3/f is below the upper limit of −1.7, the negative focal power of the third lens 40 and the positive focal power of the first lens 20 are not unduly large. This is important because if the focal power of the first lens 20 is unduly large, the lens aberration of the lens system caused thereby may become difficult to correct.

Preferably, the second lens 30 satisfies the following condition:

$$-0.6 < R4/[f \times (n-1)] < -0.3, \quad (4)$$

wherein, R4 is the radius of curvature of the surface of the second lens 30 that faces the object side, n is the refractive index of the second lens 30, and R4/[f×(n−1)] is a ratio of the focal length of the concave surface of the second lens 30 that faces the object side to the focal length of the lens system.

Condition (4) is for correcting field curvature, thereby obtaining a flat field. In one aspect, when the ratio R4/[f×(n−1)] is above the lower limit of −0.6, the negative Petzval curvature of field caused by the concave surface of the second lens 30 that faces the object side can compensate the total positive Petzval curvature of field caused by the other surfaces of the other lenses 20, 40 of the lens system. In another aspect, when the ratio R4/[f×(n−1)] is below the upper limit of −0.3, the negative focal power of the concave surface of the second lens 30 that faces the object side is not unduly large. Thereby, the positive coma and lateral chromatic aberrations caused by the first lens 20 can be effectively compensated and corrected. In addition, high-order aberrations of the lens system may be effectively reduced, due to the radius of curvature R4 being relatively large. Because the concave surface of the second lens 30 that faces the object side has the smallest radius of curvature R4, in order to correct the field curvature while not creating high-order aberrations, the concave surface of the second lens 30 that faces the object side should be configured to be concave and face the aperture stop 10.

Further, the first lens 20 satisfies the following condition:

$$-470 < C_2 \times (f1/R_n^2) < -280, \quad (5)$$

wherein, $C_2$ is the power phase coefficient of the phase function of the diffraction grating formed on a surface of an image side of the first lens 20, and $R_n$ is the normalization radius of the diffraction grating.

Condition (5) is for limiting the share of refracting power of the diffraction grating on the surface of the image side of the first lens 20. In one aspect, when the ratio $C_2 \times (f1/R_n^2)$ is above the lower limit of −470, the diffraction grating has a relatively large critical dimension and is thus relatively easy to manufacture. In another aspect, when the ratio $C_2 \times (f1/R_n^2)$ is below the upper limit of −280, the diffraction grating has proper refracting power and can appropriately correct chromatic aberration of the lens system.

In general, a surface of at least one of the first, second and third lenses 20, 30, 40 of the system is aspheric. Preferably, each of the first, second and third lenses 20, 30, 40 has at least one aspheric surface. More preferably, opposite surfaces of each of the second lens 30 and the third lens 40 are aspheric.

Also, in order to simplify the required manufacturing technology and reduce manufacturing costs, the first, second and third lenses 20, 30, 40 are made of essentially the same plastic. Preferably, the first lens 20 and the second lens 30 are made from a zeonex material or an equivalent material having low water absorbency. For example, the first and second lenses 20, 30 can be made from a polyolefin resin or a cyclo-olefin polymer material.

Figure 3A:
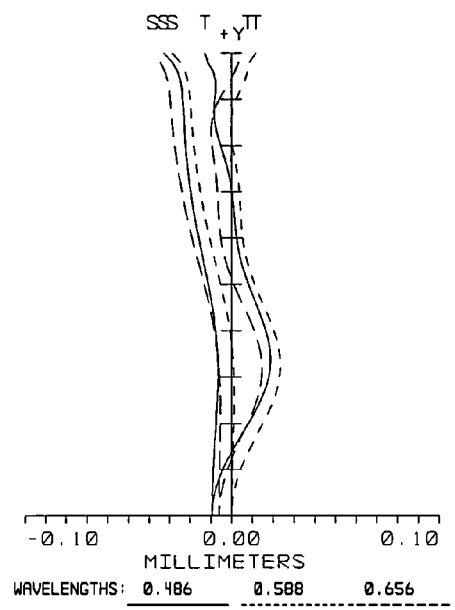
FIGS. 3A, 3B, 4 and 5 are graphs respectively showing field curvature and distortion, longitudinal spherical aberration, and lateral chromatic aberration curves for a lens system in accordance with a first exemplary embodiment of the present invention.
Figure 3B:
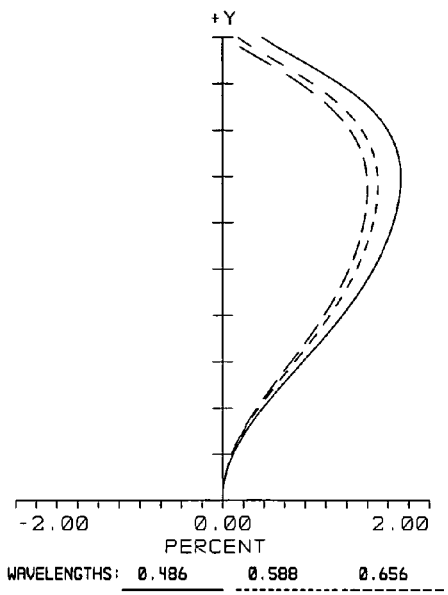
Figure 4:
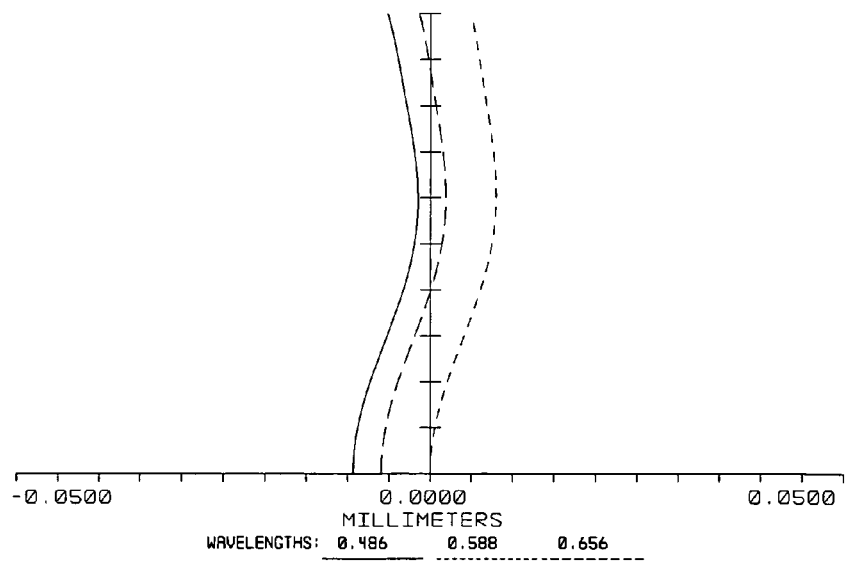
Figure 5:
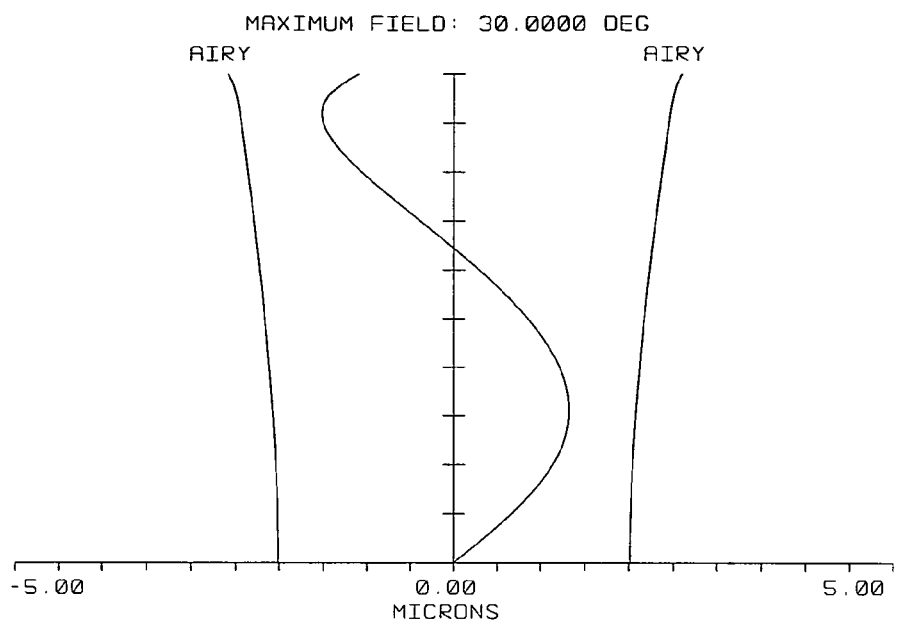
Figure 6A:
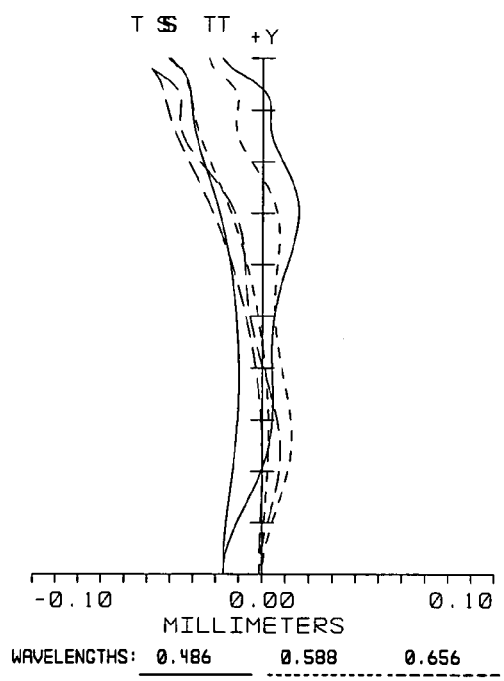
FIGS. 6A, 6B, 7 and 8 are graphs respectively showing field curvature and distortion, longitudinal spherical aberration, and lateral chromatic aberration curves for a lens system in accordance with a second exemplary embodiment of the present invention.
Figure 6B:
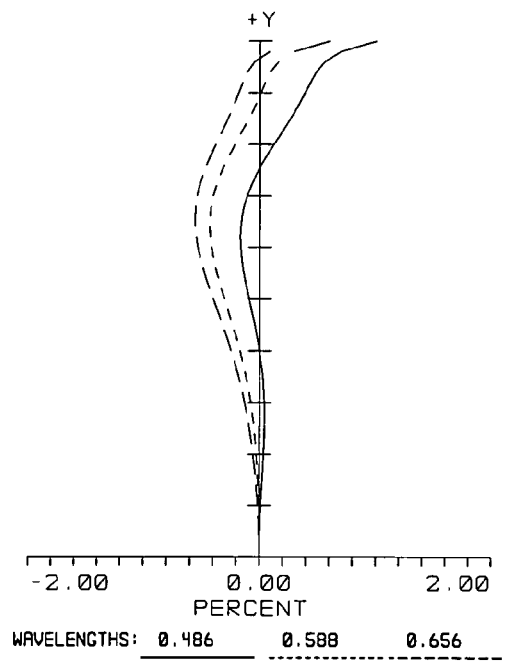
Figure 7:
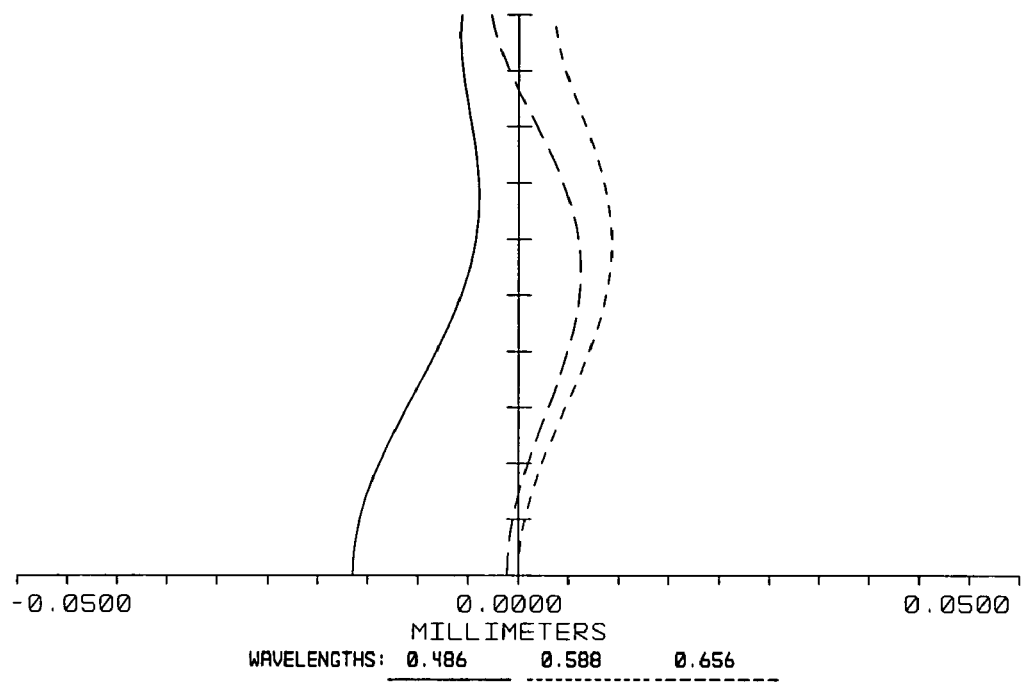
Figure 8:
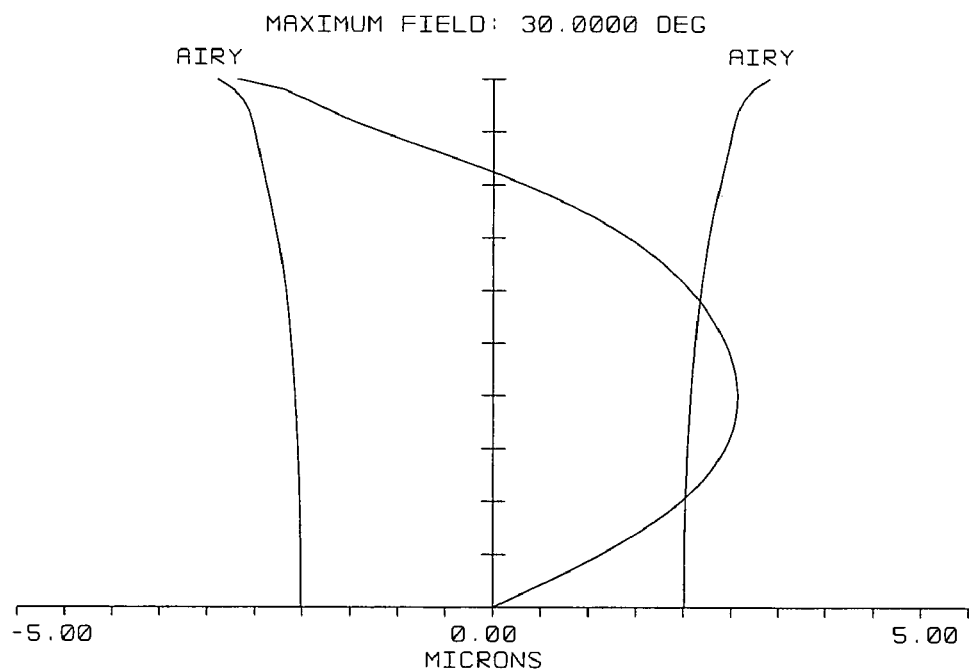
Figure 9A:
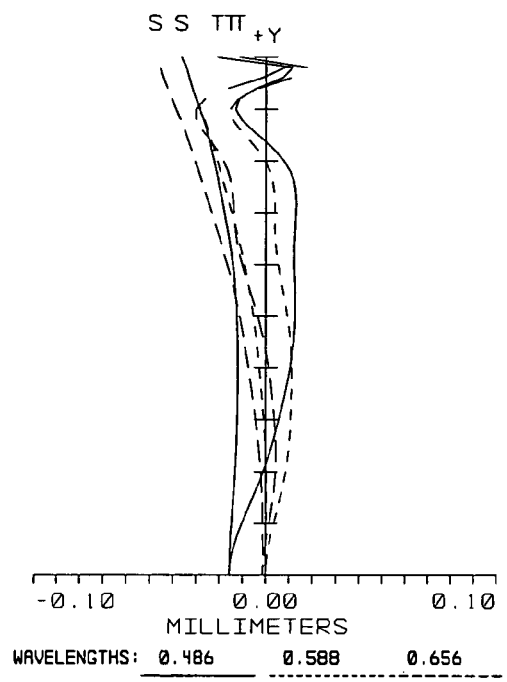
FIGS. 9A, 9B, 10 and 11 are graphs respectively showing field curvature and distortion, longitudinal spherical aberration, and lateral chromatic aberration curves for a lens system in accordance with a third exemplary embodiment of the present invention.
Figure 9B:
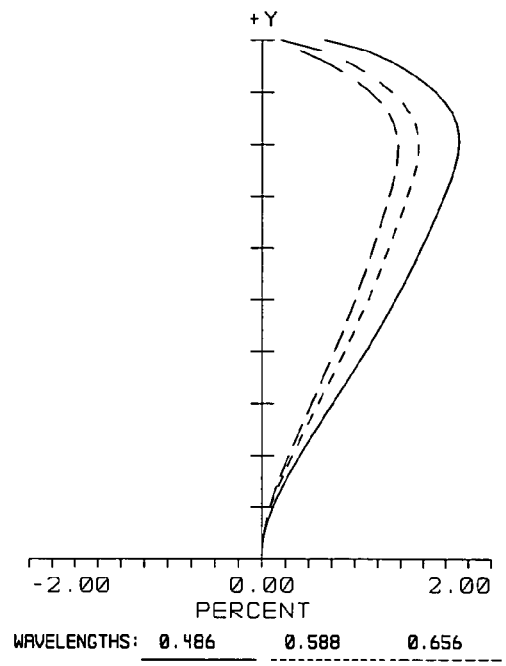
Figure 10:
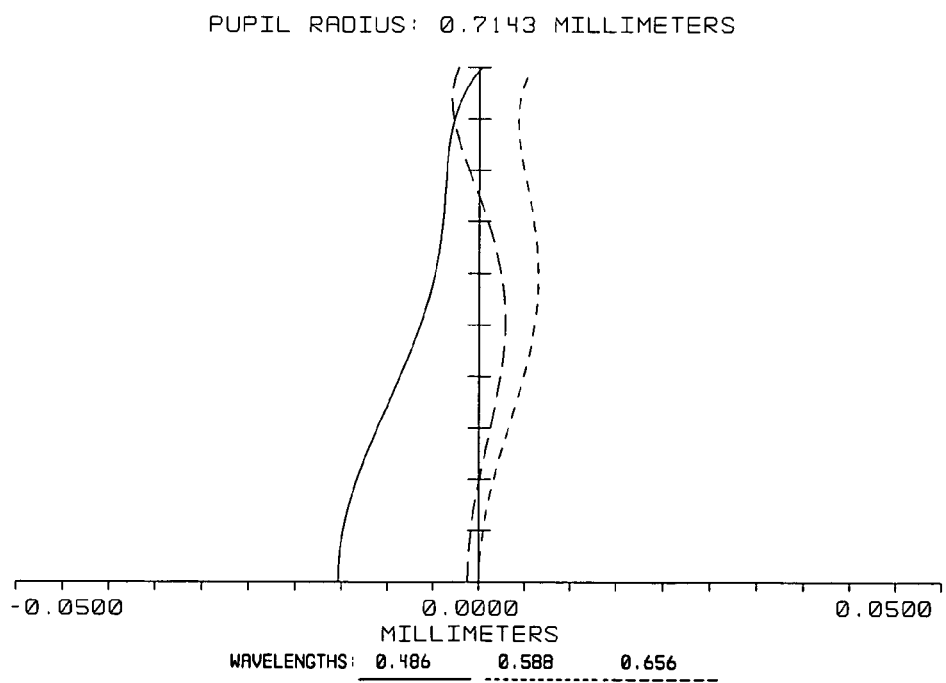
Figure 11:
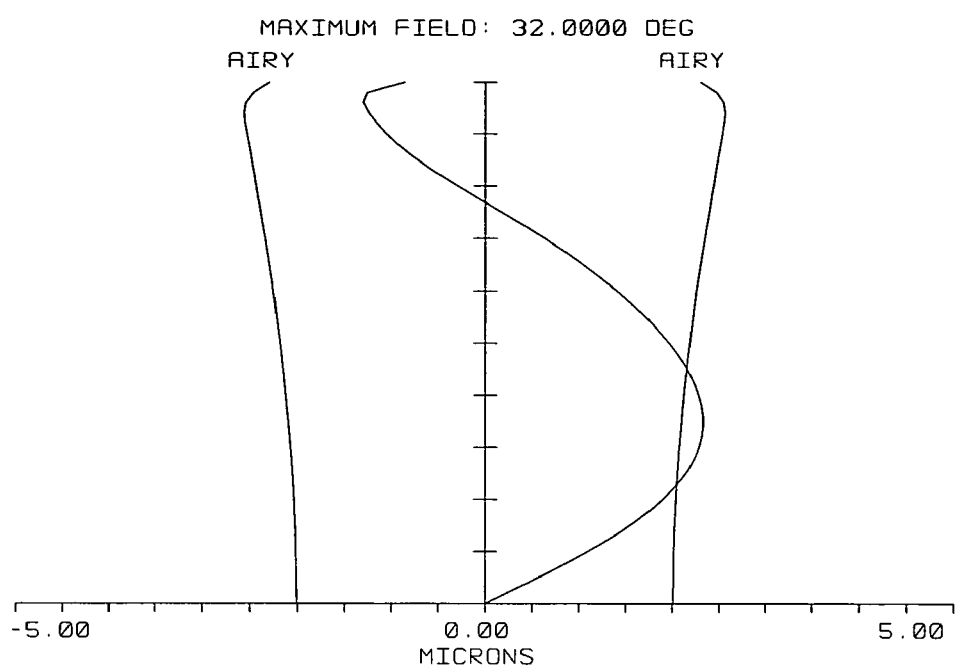
Figure 12A:
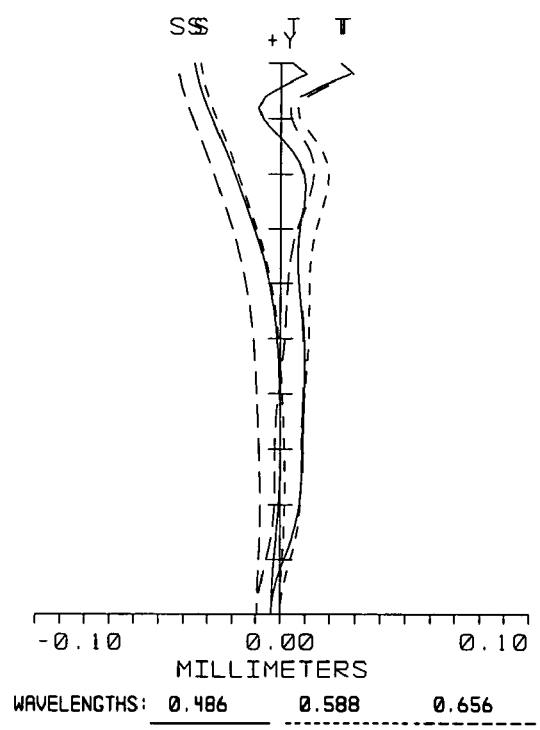
FIGS. 12A, 12B, 13 and 14 are graphs respectively showing field curvature and distortion, longitudinal spherical aberration, and lateral chromatic aberration curves for a lens system in accordance with a fourth exemplary embodiment of the present invention.
Figure 12B:
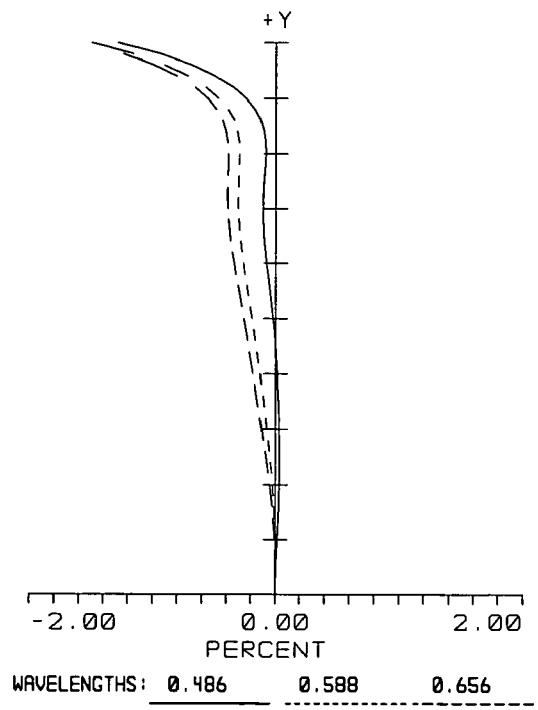
Figure 13:
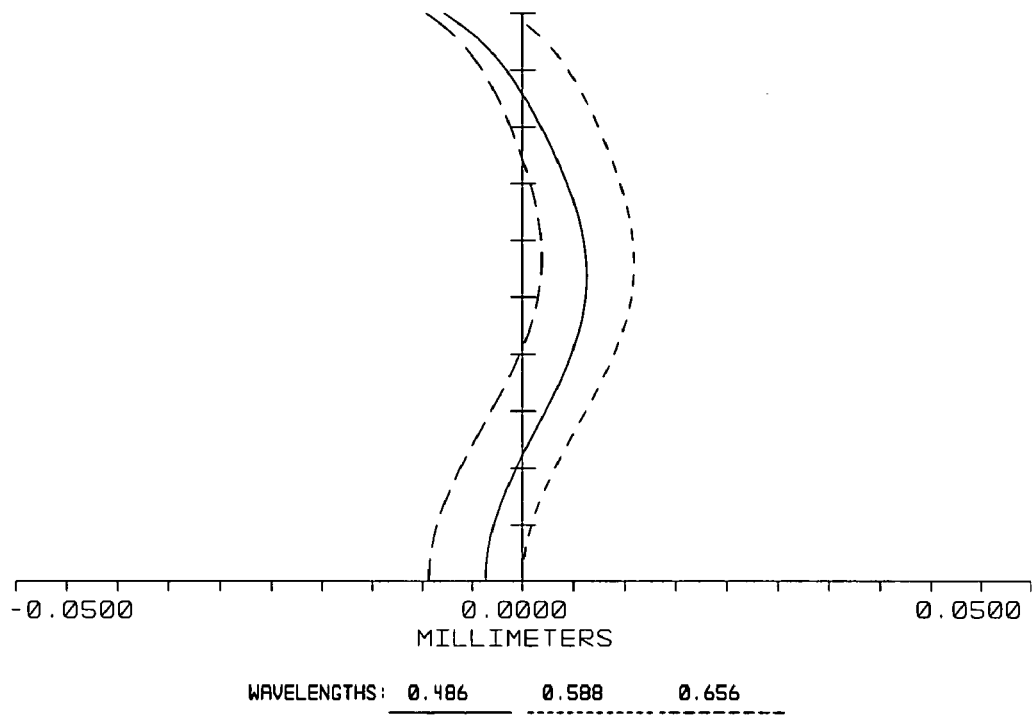
Figure 14:
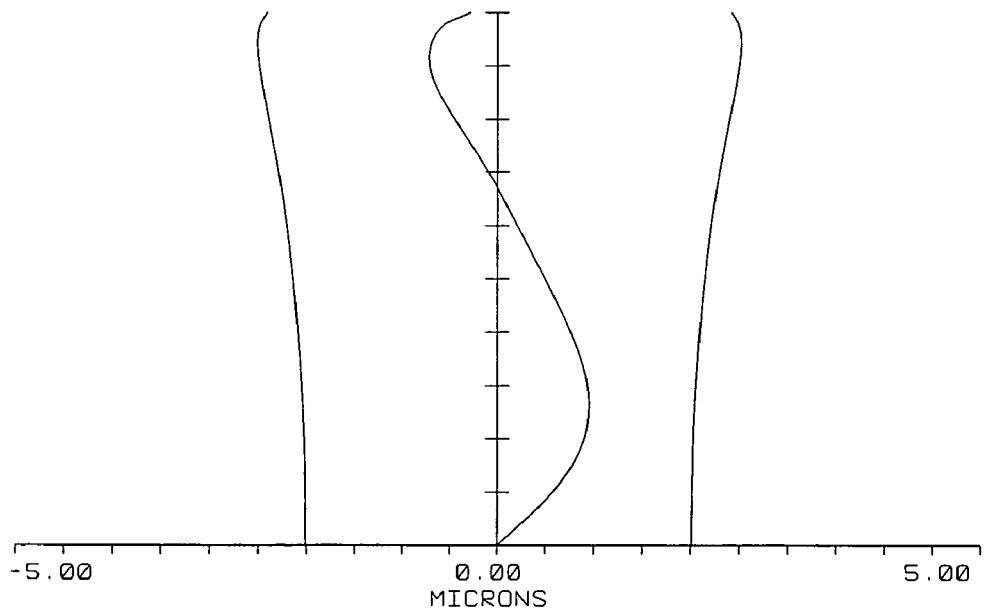
Figure 15A:
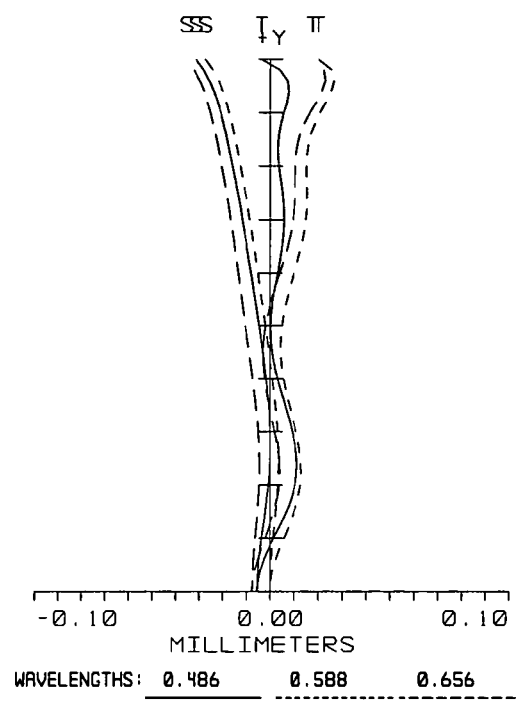
FIGS. 15A, 15B, 16 and 17 are graphs respectively showing field curvature and distortion, longitudinal spherical aberration, and lateral chromatic aberration curves for a lens system in accordance with a fifth exemplary embodiment of the present invention.
Figure 15B:
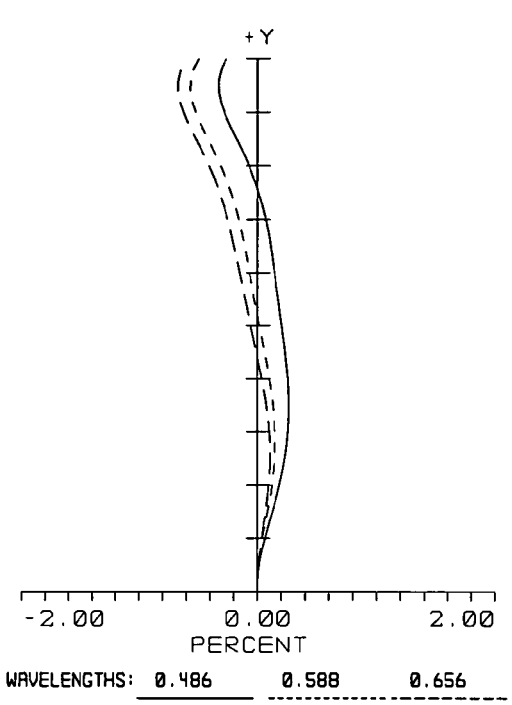
Figure 16:
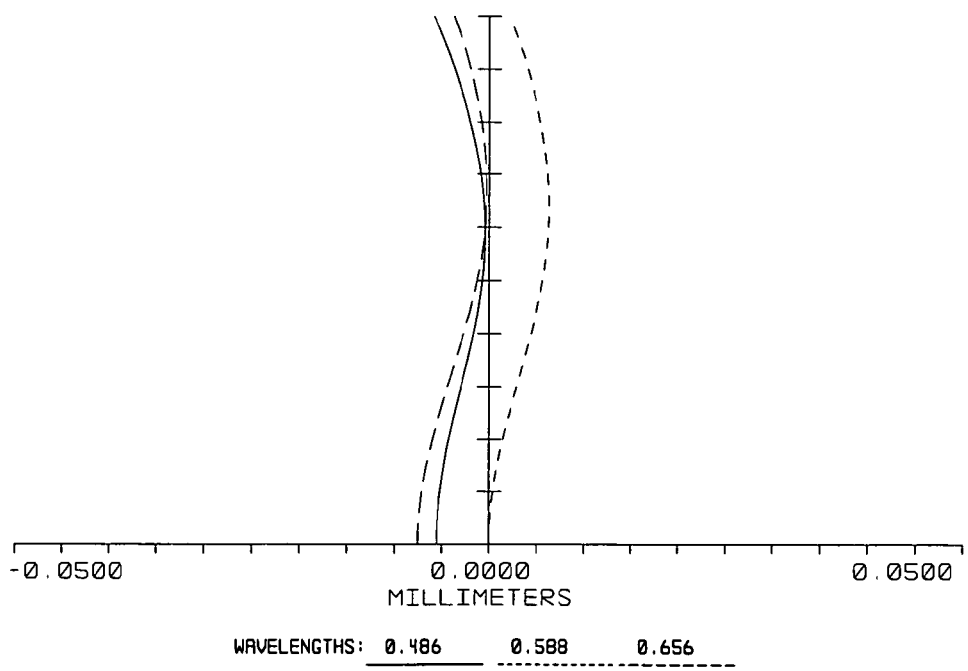
Figure 17:
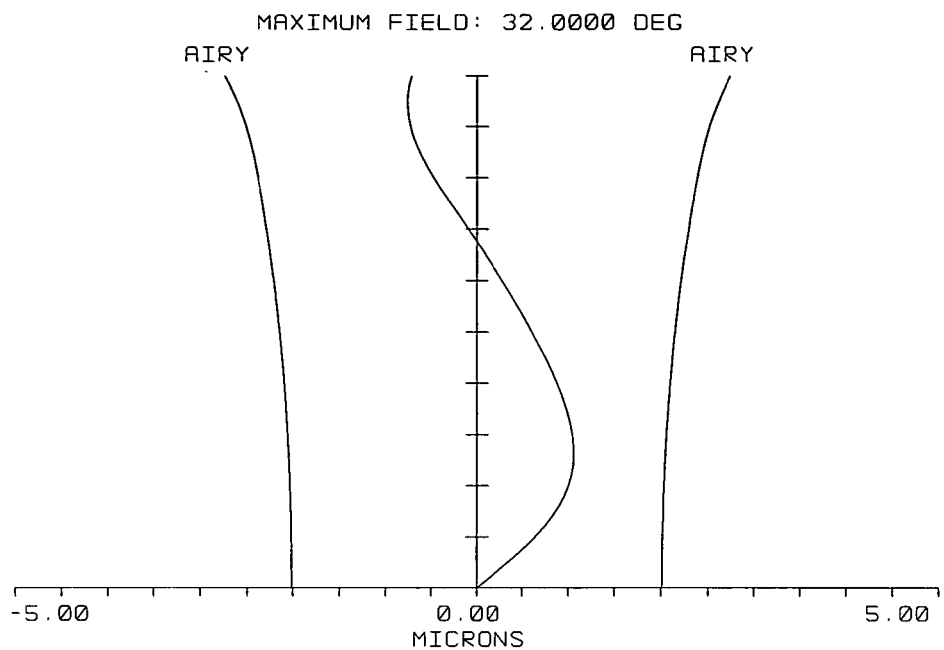
Figure 18A:
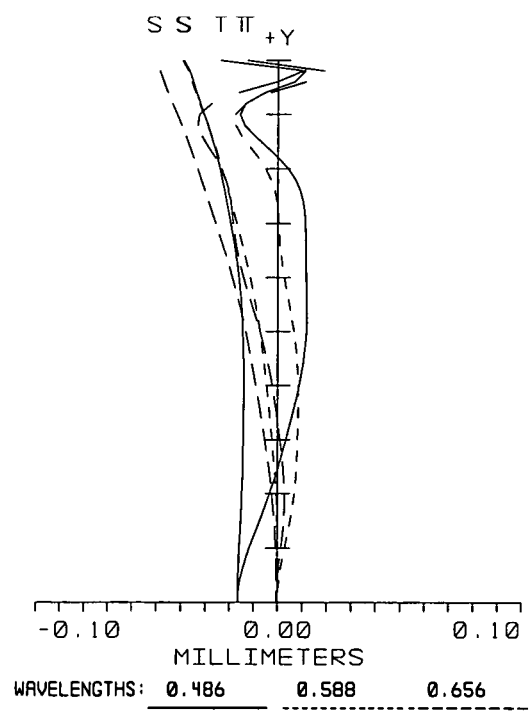
FIGS. 18A, 18B, 19 and 20 are graphs respectively showing field curvature and distortion, longitudinal spherical aberration, and lateral chromatic aberration curves for a lens system in accordance with a sixth exemplary embodiment of the present invention.
Figure 18B:
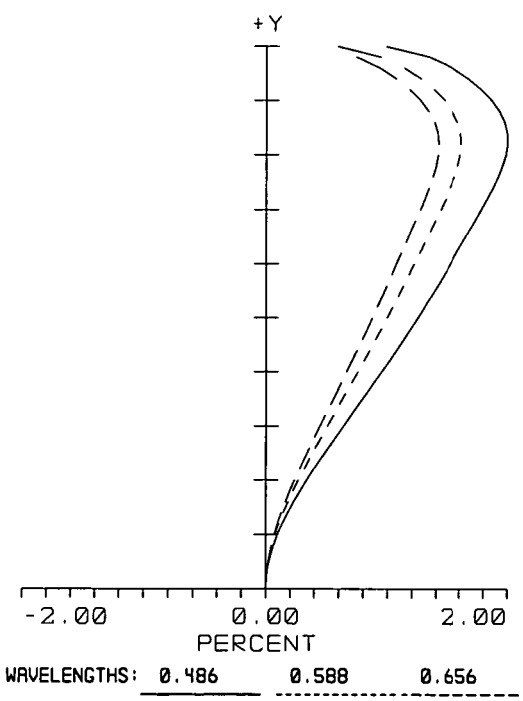
Figure 19:
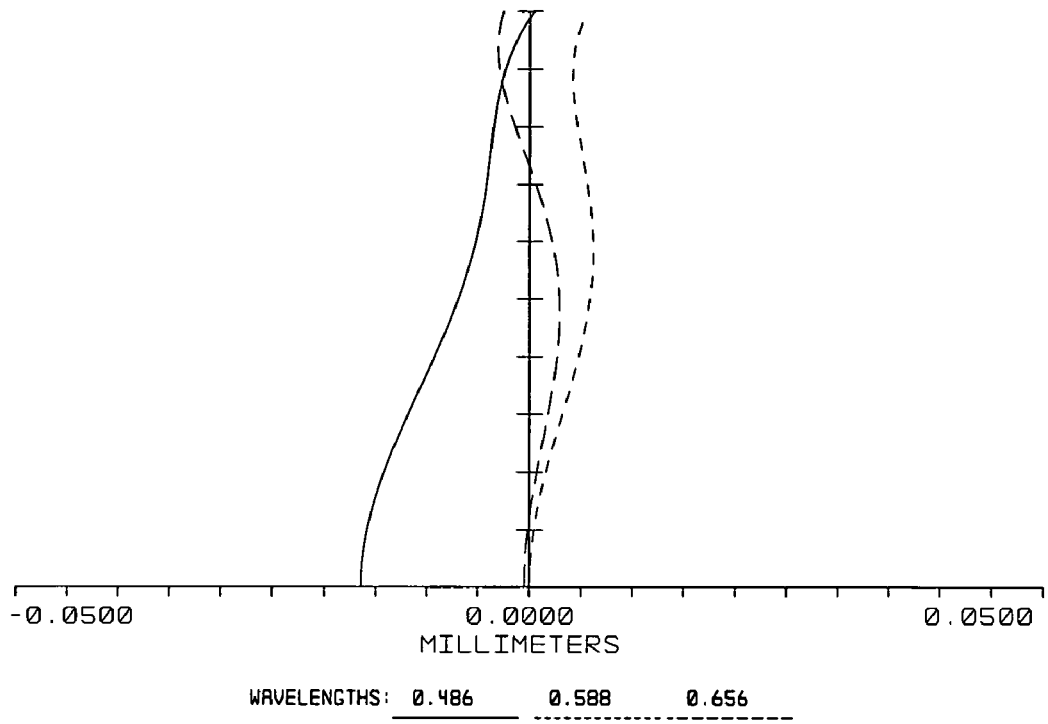
Figure 20:
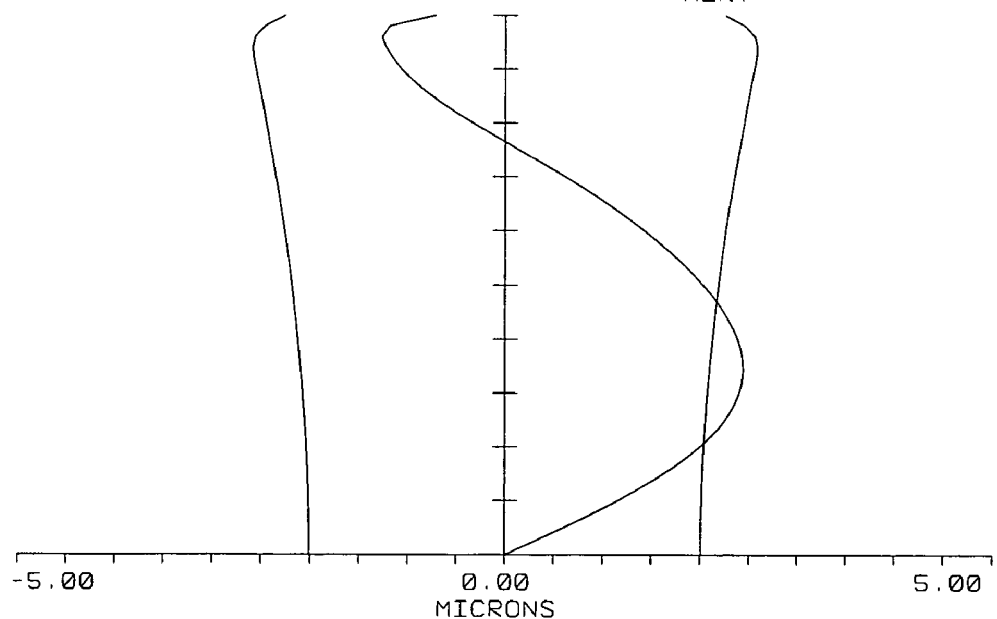
Figure 21A:
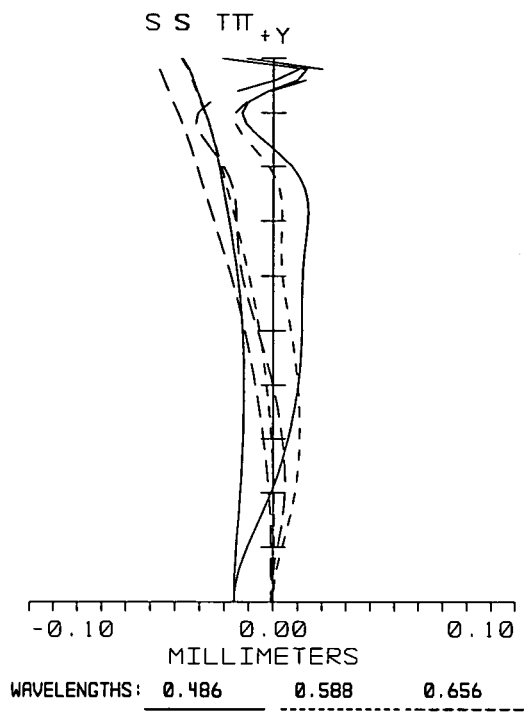
FIGS. 21A, 21B, 22 and 23 are graphs respectively showing field curvature and distortion, longitudinal spherical aberration, and lateral chromatic aberration curves for a lens system in accordance with a seventh exemplary embodiment of the present invention.
Figure 21B:
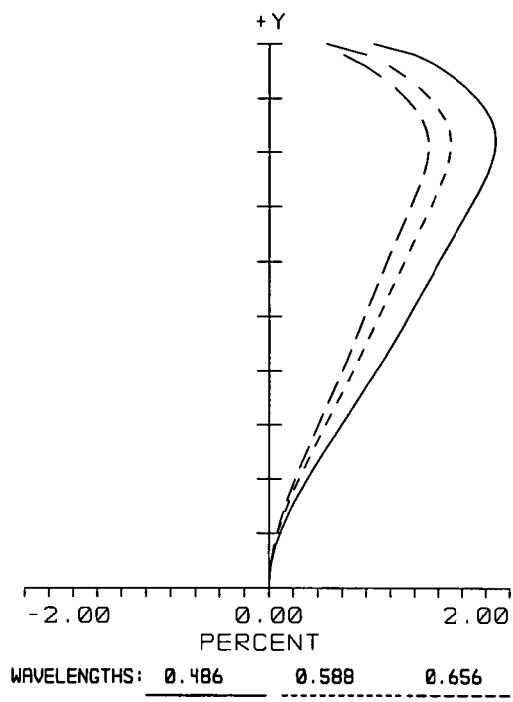
Figure 22:
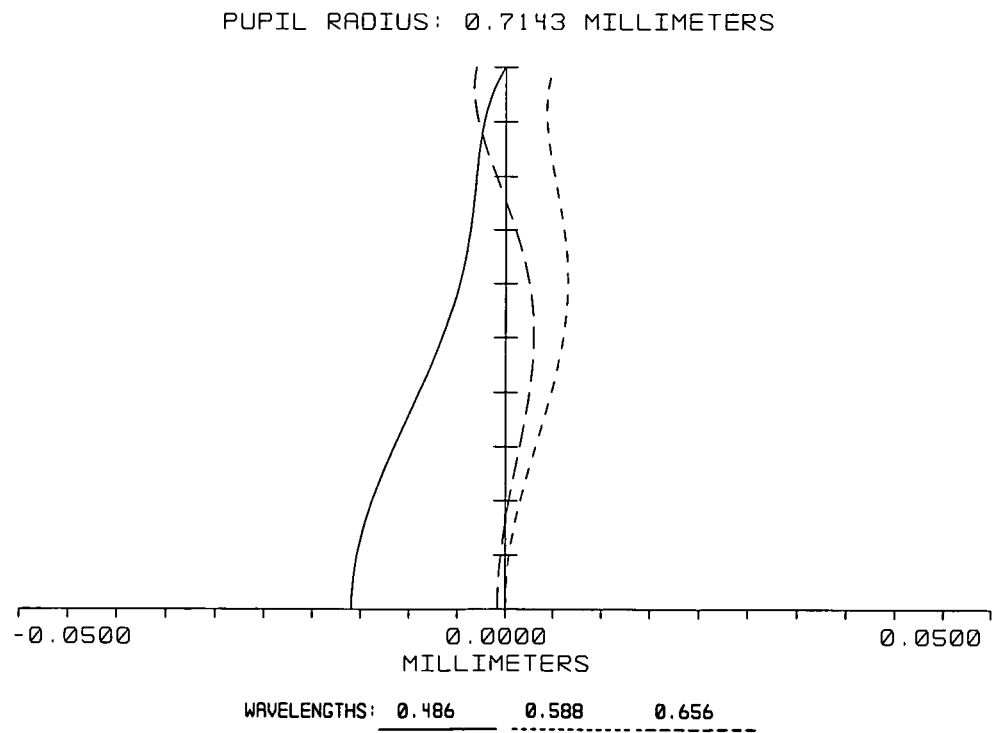
Figure 23:
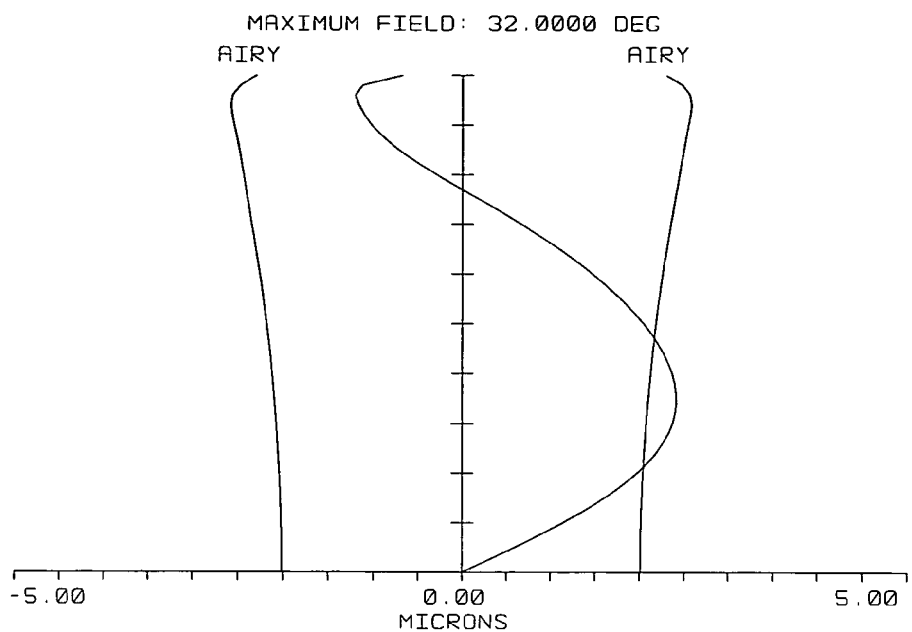
Figure 24A:
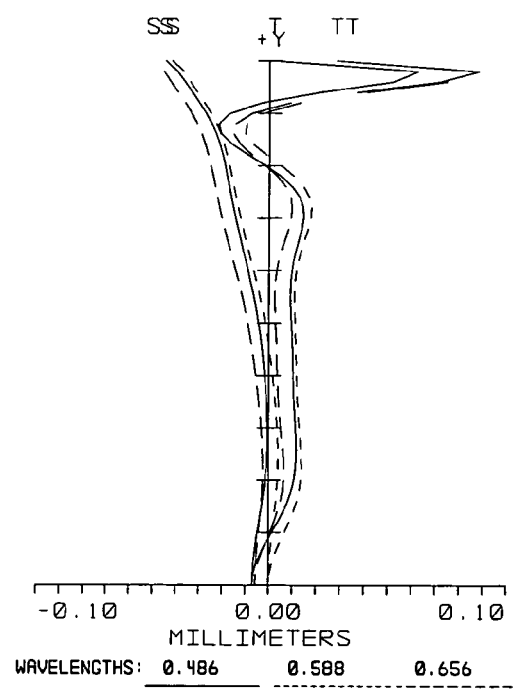
FIGS. 24A, 24B, 25 and 26 are graphs respectively showing field curvature and distortion, longitudinal spherical aberration, and lateral chromatic aberration curves for a lens system in accordance with an eighth exemplary embodiment of the present invention.
Figure 24B:
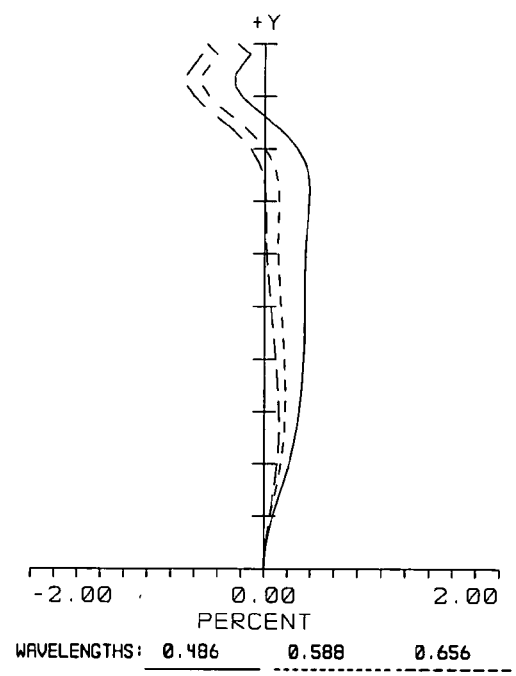
Figure 25:
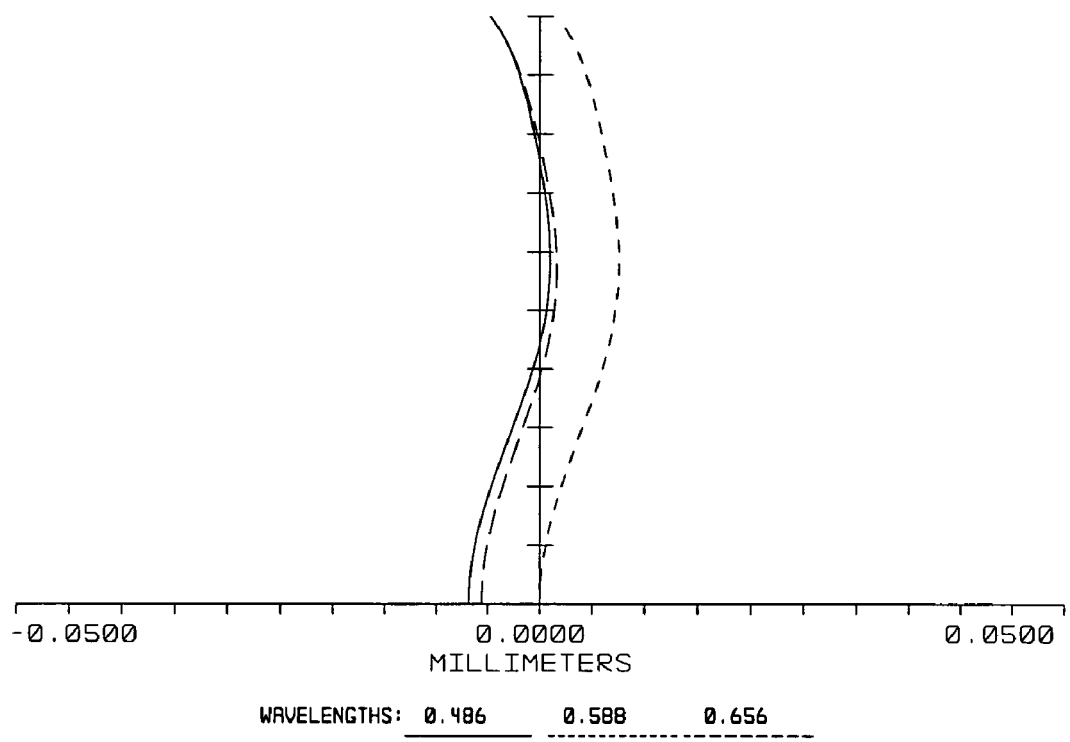
Figure 26:
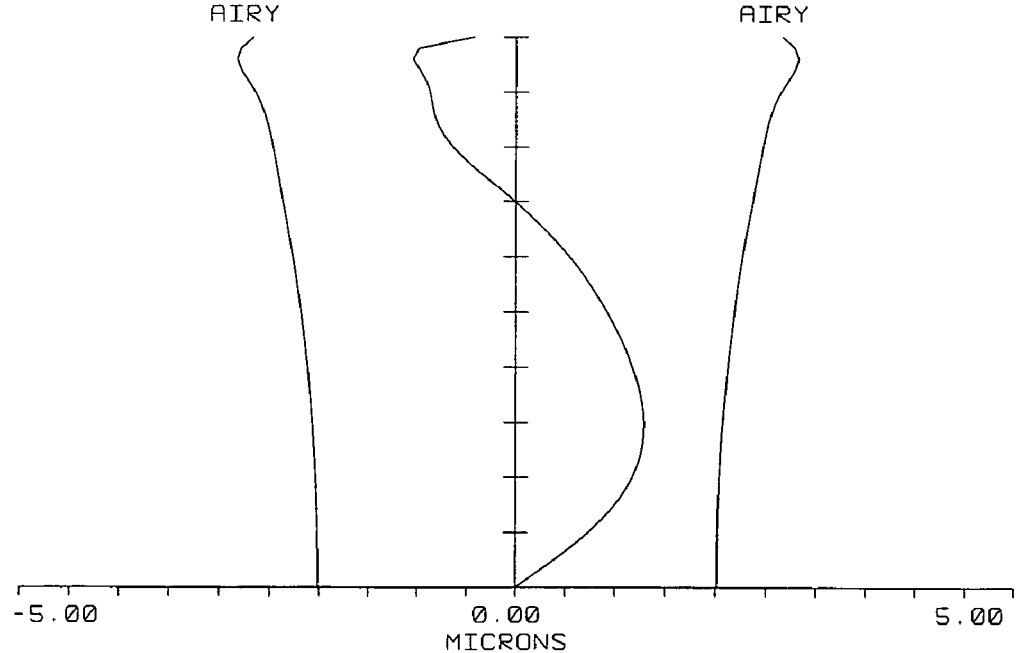

The above explanations outline fundamental constituent features of the present invention. Examples of the system will be described below with reference to FIGS. 3A, 3B through to FIG. 26. It is to be understood that the invention is not limited to these examples. The following are symbols used in each exemplary embodiment.

T: length from the aperture stop 10 to the image pick-up surface 60
f: focal length of the lens system
FNo: F number
ω: half angle of field of view
2ω: angle of field of view
Φ: emitting angle of chief rays
R: radius of curvature
d: distance between surfaces on the optical axis of the system Surfaces of the first, second and third lenses 20, 30 and 40 are respectively referred to as the first, second, third, fourth, fifth and sixth surface, in that order from the object side to the image side.

In each example, the first, second and third lenses 20, 30 and 40 are made from the E48R type of zeonex material, which is available from the Japanese Zeon Corporation. The E48R type of zeonex material has a refractive index of 1.53116017 and an Abbe constant of 56.0. Alternatively, the first, second and third lenses 20, 30 and 40 are made from another material having characteristics similar to those of the E48R type of zeonex material. The shape of each aspheric surface is provided by expression 1 below. Expression 1 is based on a Cartesian coordinate system, with the vertex of the surface being the origin, and the optical axis extending from the vertex being the x-axis.

Expression 1:

$$x = \frac{cr^2}{1+\sqrt{1-(k+1)c^2r^2}} + \sum A_{2i}r^{2i}$$

where, x is a depth from the surface to a tangent plane of a vertex of the surface, r is a height from the optical axis to the surface, c is a vertex curvature, k is a conic constant, and $A_{2i}$ are 2i-th order correction coefficients of the aspheric surface.

The diffraction grating is formed on the second surface on an image side of the first lens 20, and the diffraction grating profile is provided by the phase modulation expression 2 below.

Expression 2:

$$\phi(r) = \sum_i C_{2i}\left(\frac{r}{R_n}\right)^{2i}$$

$$= C_2\left(\frac{r}{R_n}\right)^2 + C_4\left(\frac{r}{R_n}\right)^4 + C_6\left(\frac{r}{R_n}\right)^6 + C_8\left(\frac{r}{R_n}\right)^8 + C_{10}\left(\frac{r}{R_n}\right)^{10}$$

where, φ(r) is equal to an integer multiple of 2π, r is the radius of a next zone of the diffraction grating profile, $R_n$ is the normalization radius of the diffraction grating, and $C_{2i}$ is the 2i-th power phase coefficient of the phase function of the diffraction grating.

EXAMPLE 1

Tables 1, 2 and 3 show lens data of a lens system of a first exemplary embodiment of the present invention.

TABLE 1 f = 4.4 mm  T = 6.73 mm  FNo = 2.8  ω = 30°

| Surface | R (mm) | D (mm) | k |
|---|---|---|---|
| stop 10 | infinity | 0.2601023 | 0 |
| 1st | 2.85213 | 1.692002 | −6.675179 |
| 2nd | −16.50238 | 0.9384883 | 9.999999 |
| 3rd | −1.187412 | 1.03091 | −1.805146 |
| 4th | −1.215948 | 0 | −1.745693 |
| 5th | 2.767822 | 0.9000014 | −6.361876 |
| 6th | 1.793053 | 0.7 | −6.092294 |

TABLE 2

| Surface | Aspheric coefficient | | | | |
|---|---|---|---|---|---|
| | $A_4$ | $A_6$ | $A_8$ | $A_{10}$ | $A_{12}$ |
| 1st | $2.877341 \times 10^{-2}$ | $-5.773958 \times 10^{-3}$ | $-4.045874 \times 10^{-3}$ | $1.683110 \times 10^{-3}$ | |
| 2nd | $-2.668821 \times 10^{-2}$ | $-2.053674 \times 10^{-3}$ | $-8.794724 \times 10^{-3}$ | $2.34244 \times 10^{-3}$ | |
| 3rd | $-1.123133 \times 10^{-1}$ | $2.842640 \times 10^{-2}$ | $-5.296504 \times 10^{-3}$ | $5.867407 \times 10^{-3}$ | $-1.663313 \times 10^{-3}$ |
| 4th | $-2.664732 \times 10^{-2}$ | $3.386863 \times 10^{-3}$ | $2.997939 \times 10^{-3}$ | $1.530952 \times 10^{-3}$ | $-3.893638 \times 10^{-4}$ |
| 5th | $-2.722462 \times 10^{-3}$ | $-2.155626 \times 10^{-4}$ | $3.973477 \times 10^{-6}$ | $-8.507167 \times 10^{-6}$ | $-2.90042 \times 10^{-6}$ |
| 6th | $-1.964859 \times 10^{-2}$ | $3.377467 \times 10^{-3}$ | $-7.353407 \times 10^{-4}$ | $6.044859 \times 10^{-5}$ | $-3.451060 \times 10^{-6}$ |

TABLE 3

| | Diffractive phase coefficients | | | | |
|---|---|---|---|---|---|
| Surface | $R_n$ | $C_2$ | $C_4$ | $C_6$ | $C_8$ | $C_{10}$ |
| $2^{nd}$ | 1.1000002 | −117.08549 | 3.003821 | 2.357545 | 4.996932 | −4.209696 |

FIGS. 3A, 3B, 4 and 5 are graphs respectively showing field curvature and distortion, longitudinal spherical aberration, and lateral chromatic aberration curves for the lens system of Example 1. In Example 1, the height of the diffraction grating is 1.106 μm, the smallest critical dimension of the diffraction grating is 25.8 μm, and the diffraction grating has 23 zones.

EXAMPLE 2

Tables 4, 5 and 6 show lens data of a lens system of the second exemplary embodiment of the present invention.

TABLE 4

| f = 4.4 mm T = 7.0 mm FNo = 2.8 ω = 30° | | | |
|---|---|---|---|
| Surface | R (mm) | D (mm) | k |
| stop 10 | Infinity | 0.2 | 0 |
| $1^{st}$ | 3.416087 | 1.783368 | 0.6779211 |
| $2^{nd}$ | −10.00076 | 1 | 0 |
| $3^{rd}$ | −1.293953 | 1.136765 | −3.245598 |
| $4^{th}$ | −1.185436 | 0.2 | −2.227746 |
| $5^{th}$ | 2.631857 | 0.9279289 | −7.253523 |
| $6^{th}$ | 1.413747 | 0.6 | −5.543591 |

TABLE 5

| | Aspheric coefficient | | | | |
|---|---|---|---|---|---|
| Surface | $A_4$ | $A_6$ | $A_8$ | $A_{10}$ | $A_{12}$ |
| $1^{st}$ | $-7.208258 \times 10^{-3}$ | $4.472575 \times 10^{-3}$ | $-4.828247 \times 10^{-3}$ | $1.392615 \times 10^{-3}$ | |
| $3^{rd}$ | $-1.082967 \times 10^{-1}$ | $6.490311 \times 10^{-2}$ | $-6.651603 \times 10^{-3}$ | $-1.752402 \times 10^{-3}$ | $1.522278 \times 10^{-4}$ |
| $4^{th}$ | $-4.190458 \times 10^{-2}$ | $1.393036 \times 10^{-2}$ | $2.300867 \times 10^{-3}$ | $-5.504961 \times 10^{-4}$ | $-1.715181 \times 10^{-5}$ |
| $5^{th}$ | $-7.929546 \times 10^{-3}$ | $5.279009 \times 10^{-3}$ | $-1.867052 \times 10^{-3}$ | $3.126416 \times 10^{-4}$ | $-3.072791 \times 10^{-5}$ |
| $6^{th}$ | $-2.478675 \times 10^{-2}$ | $5.440122 \times 10^{-3}$ | $-5.662993 \times 10^{-4}$ | $-5.893546 \times 10^{-5}$ | $6.781746 \times 10^{-6}$ |

TABLE 6

| | Diffractive phase coefficients | | | | |
|---|---|---|---|---|---|
| Surface | $R_n$ | $C_2$ | $C_4$ | $C_6$ | $C_8$ | $C_{10}$ |
| $2^{nd}$ | 1.1000002 | −91.080615 | −28.886361 | −10.515002 | 50.957318 | −22.6874 |

FIGS. 6A, 6B, 7 and 8 are graphs respectively showing field curvature and distortion, longitudinal spherical aberration, and lateral chromatic aberration curves for the lens system of Example 2. In Example 2, the height of the diffraction grating is 1.106 μm, the smallest critical dimension of the diffraction grating is 28.6 μm, and the diffraction grating has 22 zones.

EXAMPLE 3

Tables 7, 8 and 9 show lens data of a lens system of the third exemplary embodiment of the present invention.

TABLE 7

| f = 4 mm T = 6.69 mm FNo = 2.8 ω = 32° | | | |
|---|---|---|---|
| Surface | R (mm) | D (mm) | k |
| stop 10 | Infinity | 0.2 | 0 |
| $1^{st}$ | 4.467078 | 1.85 | 0.5683445 |
| $2^{nd}$ | −2.857154 | 0.8 | 1.126082 |
| $3^{rd}$ | −1.067911 | 1.190802 | −3.375672 |
| $4^{th}$ | −1.393695 | 0.1 | −0.931164 |
| $5^{th}$ | 1.776744 | 0.8 | −1.865958 |
| $6^{th}$ | 1.352703 | 0.75 | −3.520298 |

TABLE 8

| | Aspheric coefficient | | | | |
|---|---|---|---|---|---|
| Surface | $A_4$ | $A_6$ | $A_8$ | $A_{10}$ | $A_{12}$ |
| $1^{st}$ | $-1.739670 \times 10^{-2}$ | $4.460540 \times 10^{-3}$ | $-8.1149169 \times 10^{-3}$ | $7.974597 \times 10^{-4}$ | |
| $3^{rd}$ | $-1.500550 \times 10^{-1}$ | $1.597219 \times 10^{-1}$ | $-7.50090 \times 10^{-2}$ | $1.984335 \times 10^{-2}$ | $-2.529159 \times 10^{-3}$ |
| $4^{th}$ | $3.308997 \times 10^{-2}$ | $8.505484 \times 10^{-3}$ | $4.629077 \times 10^{-3}$ | $-2.316088 \times 10^{-3}$ | $2.856638 \times 10^{-4}$ |
| $5^{th}$ | $-5.768892 \times 10^{-2}$ | $2.651005 \times 10^{-2}$ | $-7.619384 \times 10^{-3}$ | $1.178824 \times 10^{-3}$ | $-7.753375 \times 10^{-5}$ |

TABLE 8-continued

| | Aspheric coefficient | | | | |
|---|---|---|---|---|---|
| Surface | $A_4$ | $A_6$ | $A_8$ | $A_{10}$ | $A_{12}$ |
| $6^{th}$ | $-3.243003 \times 10^{-2}$ | $1.485220 \times 10^{-2}$ | $-4.198493 \times 10^{-3}$ | $5.868180 \times 10^{-4}$ | $-3.546822 \times 10^{-5}$ |

TABLE 9

| | Diffractive phase coefficients | | | | |
|---|---|---|---|---|---|
| Surface | $R_n$ | $C_2$ | $C_4$ | $C_6$ | $C_8$ | $C_{10}$ |
| $2^{nd}$ | 1 | $-78.966971$ | $-29.002009$ | $10.343386$ | $15.849894$ | $-8.0910558$ |

FIGS. 9A, 9B, 10 and 11 are graphs respectively showing field curvature and distortion, longitudinal spherical aberration, and lateral chromatic aberration curves for the lens system of Example 3. In Example 3, the height of the diffraction grating is 1.106 μm, the smallest critical dimension of the diffraction grating is 21.8 μm, and the diffraction grating has 23 zones.

EXAMPLE 4

Tables 10, 11 and 12 show lens data of a lens system of the fourth exemplary embodiment of the present invention.

TABLE 10

| f = 4 mm T = 6.4 mm FNo = 2.8 ω = 32° | | | |
|---|---|---|---|
| Surface | R (mm) | D (mm) | k |
| stop 10 | Infinity | 0.2 | 0 |
| $1^{st}$ | 3.957507 | 1.69884 | 0.4496782 |
| $2^{nd}$ | $-3.010868$ | 0.7906053 | 3.171986 |
| $3^{rd}$ | $-0.945834$ | 1.068392 | $-2.804399$ |
| $4^{th}$ | $-1.254566$ | 0.1 | $-1.32612$ |
| $5^{th}$ | 1.815533 | 0.8 | $-4.94135$ |
| $6^{th}$ | 1.331929 | 0.75 | $-4.698205$ | the lens system of Example 4. In Example 4, the height of the diffraction grating is 1.106 μm, the smallest critical dimension of the diffraction grating is 26.4 μm, and the diffraction grating has 23 zones.

EXAMPLE 5

Tables 13, 14 and 15 show lens data of a lens system of the fifth exemplary embodiment of the present invention.

TABLE 13

| f = 4 mm T = 6.68 mm FNo = 2.8 ω = 32° | | | |
|---|---|---|---|
| Surface | R (mm) | D (mm) | k |
| stop 10 | Infinity | 0.4 | 0 |
| $1^{st}$ | 3.473315 | 1.798603 | $-4.97283$ |
| $2^{nd}$ | $-6.62516$ | 0.799452 | $-1.6057$ |
| $3^{rd}$ | $-1.11722$ | 0.91861 | $-2.85505$ |
| $4^{th}$ | $-1.20781$ | 0 | $-1.7292$ |
| $5^{th}$ | 2.050485 | 1.015755 | $-5.07552$ |
| $6^{th}$ | 1.390964 | 0.75 | $-4.88181$ |

TABLE 11

| | Aspheric coefficient | | | | |
|---|---|---|---|---|---|
| Surface | $A_4$ | $A_6$ | $A_8$ | $A_{10}$ | $A_{12}$ |
| $1^{st}$ | $-2.162321 \times 10^{-2}$ | $8.561734 \times 10^{-3}$ | $-3.025316 \times 10^{-2}$ | $1.674375 \times 10^{-2}$ | |
| $3^{rd}$ | $-1.989365 \times 10^{-2}$ | $-3.938084 \times 10^{-3}$ | $3.270628 \times 10^{-3}$ | $1.732637 \times 10^{-3}$ | |
| $4^{th}$ | $-1.999243 \times 10^{-1}$ | $1.396777 \times 10^{-1}$ | $-4.085579 \times 10^{-2}$ | $1.120598 \times 10^{-2}$ | $2.664567 \times 10^{-3}$ |
| $5^{th}$ | $3.037960 \times 10^{-3}$ | $1.718152 \times 10^{-2}$ | $9.291157 \times 10^{-4}$ | $-1.062066 \times 10^{-4}$ | $-1.179845 \times 10^{-4}$ |
| $6^{th}$ | $-2.892678 \times 10^{-2}$ | $1.966380 \times 10^{-2}$ | $-6.743295 \times 10^{-3}$ | $1.162488 \times 10^{-3}$ | $-8.399170 \times 10^{-5}$ |

TABLE 12

| | Diffractive phase coefficients | | | | |
|---|---|---|---|---|---|
| Surface | $R_n$ | $C_2$ | $C_4$ | $C_6$ | $C_8$ | $C_{10}$ |
| $2^{nd}$ | 1 | $-113.46795$ | $26.689135$ | $-16.900847$ | $10.848983$ | $-3.6812519$ |

FIGS. 12A, 12B, 13 and 14 are graphs respectively showing field curvature and distortion, longitudinal spherical aberration, and lateral chromatic aberration curves for

TABLE 14

| | Aspheric coefficient | | | | |
|---|---|---|---|---|---|
| Surface | $A_4$ | $A_6$ | $A_8$ | $A_{10}$ | $A_{12}$ |
| $1^{st}$ | $5.793721 \times 10^{-3}$ | $1.630978 \times 10^{-3}$ | $-7.16445 \times 10^{-3}$ | $3.244374 \times 10^{-3}$ | |
| $3^{rd}$ | $-2.376318 \times 10^{-2}$ | $6.189566 \times 10^{-3}$ | $-9.711407 \times 10^{-3}$ | $3.719245 \times 10^{-3}$ | |
| $4^{th}$ | $-9.244650 \times 10^{-2}$ | $4.215981 \times 10^{-2}$ | $-1.543446 \times 10^{-2}$ | $1.041761 \times 10^{-2}$ | $-2.080065 \times 10^{-3}$ |
| $5^{th}$ | $-1.383797 \times 10^{-2}$ | $5.120844 \times 10^{-3}$ | $-1.819283 \times 10^{-4}$ | $1.7705699 \times 10^{-3}$ | $2.965626 \times 10^{-4}$ |
| $6^{th}$ | $-1.0899589 \times 10^{-2}$ | $-4.951017 \times 10^{-4}$ | $2.140124 \times 10^{-4}$ | $-1.046039 \times 10^{-4}$ | $1.071011 \times 10^{-5}$ |

TABLE 15

| | Diffractive phase coefficients | | | | | |
|---|---|---|---|---|---|---|
| Surface | $R_n$ | $C_2$ | $C_4$ | $C_6$ | $C_8$ | $C_{10}$ |
| $2^{nd}$ | 1 | $-109.38103$ | $30.634067$ | $-25.656013$ | $13.590593$ | $-2.8428811$ |

FIGS. 15A, 15B, 16 and 17 are graphs respectively showing field curvature and distortion, longitudinal spherical aberration, and lateral chromatic aberration curves for the lens system of Example 5. In Example 5, the height of the diffraction grating is 1.106 μm, the smallest critical dimension of the diffraction grating is 27.4 μm, and the diffraction grating has 26 zones.

FIGS. 18A, 18B, 19 and 20 are graphs respectively showing field curvature and distortion, longitudinal spherical aberration, and lateral chromatic aberration curves for the lens system of Example 6. In Example 6, the height of the diffraction grating is 1.106 μm, the smallest critical dimension of the diffraction grating is 21.4 μm, and the diffraction grating has 23 zones.

EXAMPLE 6

Tables 16, 17 and 18 show lens data of a lens system of the sixth exemplary embodiment of the present invention.

EXAMPLE 7

Tables 19, 20 and 21 show lens data of a lens system of the seventh exemplary embodiment of the present invention.

TABLE 16

| f = 4 mm T = 6.72 mm FNo = 2.8 ω = 32° | | | |
|---|---|---|---|
| Surface | R (mm) | D (mm) | k |
| stop 10 | Infinity | 0.2 | 0 |
| $1^{st}$ | 4.564348 | 1.85 | 2.131019 |
| $2^{nd}$ | $-2.857151$ | 0.8 | 0 |
| $3^{rd}$ | $-1.103361$ | 1.224359 | $-3.522901$ |
| $4^{th}$ | $-1.397646$ | 0.1 | $-1.0433$ |
| $5^{th}$ | 1.809058 | 0.8 | $-2.376441$ |
| $6^{th}$ | 1.336714 | 0.75 | $-3.629066$ |

TABLE 19

| f = 4 mm T = 6.73 mm FNo = 2.8 ω = 32° | | | |
|---|---|---|---|
| Surface | R (mm) | D (mm) | k |
| stop 10 | infinity | 0.2 | 0 |
| $1^{st}$ | 4.604425 | 1.85 | 4.992468 |
| $2^{nd}$ | $-2.85715$ | 0.8 | 0 |
| $3^{rd}$ | $-1.111674$ | 1.22812 | $-3.359906$ |
| $4^{th}$ | $-1.402106$ | 0.1 | $-1.346884$ |
| $5^{th}$ | 1.79762 | 0.8 | $-2.329922$ |
| $6^{th}$ | 1.320815 | 0.75 | $-3.650435$ |

TABLE 17

| | Aspheric coefficient | | | | |
|---|---|---|---|---|---|
| Surface | $A_4$ | $A_6$ | $A_8$ | $A_{10}$ | $A_{12}$ |
| $1^{st}$ | $-1.934392 \times 10^{-2}$ | $6.624875 \times 10^{-3}$ | $-1.046328 \times 10^{-2}$ | $2.967663 \times 10^{-3}$ | |
| $3^{rd}$ | $-1.323706 \times 10^{-1}$ | $1.617697 \times 10^{-1}$ | $-8.024673 \times 10^{-2}$ | $2.181349 \times 10^{-2}$ | $-2.684135 \times 10^{-3}$ |
| $4^{th}$ | $3.547751 \times 10^{-2}$ | $6.947634 \times 10^{-3}$ | $5.069375 \times 10^{-3}$ | $2.513673 \times 10^{-3}$ | $3.230274 \times 10^{-4}$ |
| $5^{th}$ | $-4.517203 \times 10^{-2}$ | $2.221269 \times 10^{-2}$ | $-6.595241 \times 10^{-3}$ | $1.035526 \times 10^{-3}$ | $-6.863453 \times 10^{-5}$ |
| $6^{th}$ | $-3.076490 \times 10^{-2}$ | $1.394365 \times 10^{-2}$ | $3.941052 \times 10^{-3}$ | $5.500942 \times 10^{-4}$ | $-3.324903 \times 10^{-5}$ |

TABLE 18

| | Diffractive phase coefficients | | | | | |
|---|---|---|---|---|---|---|
| Surface | $R_n$ | $C_2$ | $C_4$ | $C_6$ | $C_8$ | $C_{10}$ |
| $2^{nd}$ | 1 | $-75.31199$ | $-39.744019$ | $27.223386$ | $4.993938$ | $-5.6729275$ |

TABLE 20

| Surface | Aspheric coefficient | | | | |
|---|---|---|---|---|---|
| | $A_4$ | $A_6$ | $A_8$ | $A_{10}$ | $A_{12}$ |
| $1^{st}$ | $-2.226763 \times 10^{-2}$ | $3.581066 \times 10^{-3}$ | $-7.451681 \times 10^{-3}$ | $1.310117 \times 10^{-3}$ | |
| $3^{rd}$ | $-1.128413 \times 10^{-1}$ | $1.360212 \times 10^{-1}$ | $-6.355976 \times 10^{-2}$ | $1.643149 \times 10^{-2}$ | $-1.993473 \times 10^{-3}$ |
| $4^{th}$ | $2.246656 \times 10^{-3}$ | $8.870861 \times 10^{-2}$ | $3.155667 \times 10^{-3}$ | $-1.725959 \times 10^{-3}$ | $2.191320 \times 10^{-4}$ |
| $5^{th}$ | $-4.688880 \times 10^{-2}$ | $2.347291 \times 10^{-2}$ | $-7.192738 \times 10^{-3}$ | $1.152854 \times 10^{-3}$ | $-7.719641 \times 10^{-5}$ |
| $6^{th}$ | $-3.070772 \times 10^{-2}$ | $1.461407 \times 10^{-2}$ | $-4.314560 \times 10^{-3}$ | $6.151277 \times 10^{-4}$ | $-3.712129 \times 10^{-5}$ |

TABLE 21

| Surface | Diffractive phase coefficients | | | | | |
|---|---|---|---|---|---|---|
| | $R_n$ | $C_2$ | $C_4$ | $C_6$ | $C_8$ | $C_{10}$ |
| $2^{nd}$ | 1 | $-76.36525$ | $-34.191671$ | $17.844369$ | $11.244282$ | $-7.1009299$ |

FIGS. 21A, 21B, 22 and 23 are graphs respectively showing field curvature and distortion, longitudinal spherical aberration, and lateral chromatic aberration curves for the lens system of Example 7. In Example 7, the height of the diffraction grating is 1.106 μm, the smallest critical dimension of the diffraction grating is 21.4 μm, and the diffraction grating has 23 zones.

EXAMPLE 8

Tables 22, 23 and 24 show lens data of a lens system of the eighth exemplary embodiment of the present invention.

TABLE 22

| f = 3.5 mm T = 5.8 mm FNo = 2.8 ω = 35° | | | |
|---|---|---|---|
| Surface | R (mm) | D (mm) | k |
| stop 10 | infinity | 0.2 | 0 |
| $1^{st}$ | 3.498382 | 1.61516 | 2.599337 |
| $2^{nd}$ | $-3.078539$ | 0.6625755 | 4.227829 |
| $3^{rd}$ | $-0.8876024$ | 0.9059586 | $-3.32167$ |
| $4^{th}$ | $-1.123578$ | 0.1 | $-1.225182$ |
| $5^{th}$ | 1.506643 | 0.7 | $-4.098258$ |
| $6^{th}$ | 1.157725 | 0.6562498 | $-3.97826$ |

TABLE 23

| Surface | Aspheric coefficient | | | | |
|---|---|---|---|---|---|
| | $A_4$ | $A_6$ | $A_8$ | $A_{10}$ | $A_{12}$ |
| $1^{st}$ | $-3.010799 \times 10^{-2}$ | $1.680059 \times 10^{-2}$ | $-5.790554 \times 10^{-2}$ | $4.087697 \times 10^{-2}$ | |
| $3^{rd}$ | $-2.388610 \times 10^{-2}$ | $-4.117082 \times 10^{-3}$ | $-6.402837 \times 10^{-4}$ | $7.761933 \times 10^{-3}$ | |
| $4^{th}$ | $-3.265719 \times 10^{-1}$ | $2.656042 \times 10^{-1}$ | $1.066964 \times 10^{-1}$ | $4.434963 \times 10^{-2}$ | $-1.162588 \times 10^{-2}$ |
| $5^{th}$ | $-1.056982 \times 10^{-2}$ | $2.167372 \times 10^{-2}$ | $7.281896 \times 10^{-3}$ | $-9.243571 \times 10^{-4}$ | $-3.750142 \times 10^{-4}$ |
| $6^{th}$ | $-4.799149 \times 10^{-2}$ | $4.030637 \times 10^{-2}$ | $-1.751993 \times 10^{-2}$ | $3.5750626 \times 10^{-3}$ | $-2.882744 \times 10^{-4}$ |

TABLE 24

| Surface | Diffractive phase coefficients | | | | | |
|---|---|---|---|---|---|---|
| | $R_n$ | $C_2$ | $C_4$ | $C_6$ | $C_8$ | $C_{10}$ |
| $2^{nd}$ | 0.87499975 | $-89.927399$ | 8.6857497 | $-8.0104951$ | 8.6819999 | $-2.9253583$ |

FIGS. 24A, 24B, 25 and 26 are graphs respectively showing field curvature and distortion, longitudinal spherical aberration, and lateral chromatic aberration curves for the lens system of Example 8. In Example 8, the height of the diffraction grating is 1.106 μm, the smallest critical dimension of the diffraction grating is 22.5 μm, and the diffraction grating has 23 zones.

Table 25 compares focal lengths and other parameters across Examples 1 through 8.

TABLE 25

| | Example | | | | | | | |
|---|---|---|---|---|---|---|---|---|
| | 1 | 2 | 3 | 4 | 5 | 6 | 7 | 8 |
| FNo | 2.8 | 2.8 | 2.8 | 2.8 | 2.8 | 2.8 | 2.8 | 2.8 |
| 2ω (°) | 60 | 60 | 64 | 64 | 64 | 64 | 64 | 70 |
| Φ (°) | 15.76 | 14.65 | 18.72 | 18.66 | 18.74 | 18.73 | 18.74 | 19.47 |
| T (mm) | 6.73 | 7 | 6.69 | 6.4 | 6.68 | 6.72 | 6.73 | 5.8 |
| f (mm) | 4.4 | 4.4 | 4 | 4 | 4 | 4 | 4 | 3.5 |
| f1 | 4.42 | 4.75 | 3.6 | 3.52 | 4.25 | 3.62 | 3.63 | 3.37 |
| f2 | 8.26 | 5.74 | 32.1 | 36.09 | 11.14 | 22.26 | 21.64 | 23.98 |
| f3 | −14.1 | −7.82 | −30.88 | −22.09 | −17.48 | −23.37 | −22.43 | −30.95 |
| T/f | 1.53 | 1.59 | 1.67 | 1.6 | 1.67 | 1.68 | 1.68 | 1.66 |
| f1/f | 1.01 | 1.08 | 0.9 | 0.88 | 1.06 | 0.91 | 0.91 | 0.96 |
| f2/f | 1.88 | 1.31 | 8.02 | 9.02 | 2.79 | 5.56 | 5.41 | 6.85 |
| f3/f | −3.21 | −1.78 | −7.72 | −5.52 | −4.37 | −5.84 | −5.6 | −8.84 |
| R4/[f × (n − 1)] | −0.51 | −0.55 | −0.5 | −0.45 | −0.53 | −0.52 | −0.52 | −0.48 |
| $C_2 \times f/R_n^2$ | −425.8 | −331.2 | −315.9 | −453.9 | −437.5 | −301.3 | −305.5 | −411.1 |

As shown in the above-described Examples 1-8, the inventive lens system has a field of view of at least 60°. The total length of the lens system is relatively small. The lens system can appropriately correct fundamental aberrations.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. An image pick-up lens system comprising, from an object side to an image side:
   an aperture stop;
   a biconvex first lens;
   a second lens having a concave surface facing the object side; and
   a third lens having a concave surface facing the image side;
   wherein the aperture stop and the first, second and third lenses are aligned in that order, the first, second and third lenses are made from essentially the same material, at least one of the first, second and third lenses has a diffraction grating formed thereon, and the following condition is satisfied:

$-9 < f3/f < -1.7$, wherein f3 is a focal length of the third lens, and f is a focal length of the lens system.

2. The image pick-up lens system in accordance with claim 1, wherein the second lens is a meniscus-shaped lens.

3. The image pick-up lens system in accordance with claim 1, wherein the third lens is a meniscus-shaped lens.

4. The image pick-up lens system in accordance with claim 1, wherein the first lens and the second lens have positive focal power, and the third lens has negative focal power.

5. The image pick-up lens system in accordance with claim 1, wherein the first lens has a diffraction grating formed on a convex surface thereof that faces the image side.

6. The image pick-up lens system in accordance with claim 5, wherein the following condition is also satisfied:

$-470 < C_2 \times (f1/R_n^2) < -280$, wherein, $C_2$ is a power phase coefficient of a phase function of the diffraction grating surface of the first lens, and $R_n$ is a normalization radius of the diffraction grating.

7. The image pick-up lens system in accordance with claim 1, wherein the following condition is also satisfied:

$1.4 < T/f < 1.8$, wherein T is a length from the aperture stop to an image pick-up surface.

8. The image pick-up lens system in accordance with claim 1, wherein the following condition is also satisfied:

$0.7 < f1/f < 1.2$, wherein, f1 is a focal length of the first lens.

9. The image pick-up lens system in accordance with claim 1, wherein the following condition is also satisfied:

$-0.6 < R4/[f \times (n-1)] < -0.3$, wherein, R4 is a radius of curvature of a surface of the second lens that faces the object side, n is a refractive index of the second lens, and R4/[f×(n−1)] is a ratio of a focal length of a surface of the second lens that faces the object side to a total focal length of the lens system.

10. The image pick-up lens system in accordance with claim 1, wherein at least one of the first, second and third lenses has an aspheric surface.

11. The image pick-up lens system in accordance with claim 10, wherein each of the first, second and third lenses has at least one aspheric surface.

12. The image pick-up lens system in accordance with claim 10, wherein opposite surfaces of each of the second and third lenses are aspheric.

13. The image pick-up lens system in accordance with claim 1, wherein the first, second and third lenses are made from essentially the same plastic.

14. The image pick-up lens system in accordance with claim 13, wherein the first and second lenses are made from one of a polyolefin resin and a cyclo-olefin polymer material.

15. An image pick-up system comprising:
   an aperture stop for receiving light from an outside of said system;
   an image pick-up surface used to accept said light from said aperture stop for image generation of said system; and
   at least three lenses disposed between said aperture stop and said image pick-up surface for transmitting said light therebetween, and made of same material, at least one surface of a selective lens of said at least three lenses forming a diffraction grating;
wherein said at least three lenses are made to satisfy at least one of the following conditions:

$$1.4 < T/f < 1.8, \quad (1)$$

$$0.7 < f1/f < 1.2, \quad (2)$$

$$-9 < f3/f < -1.7, \quad (3)$$

$$-0.6 < R4/[f \times (n-1)] < -0.3, \text{ and} \quad (4)$$

$$-470 < C_2 \times (f1/R_n^2) < -280 \quad (5)$$

wherein f is a focal length of said system, T is a length from said aperture stop to said image pick-up surface, f1 is a focal length of a first lens of said at least three lenses closer to said aperture stop, f3 is a focal length of a third lens of said at least three lenses closer to said image pick-up surface, R4 is a radius of curvature of a surface of a second lens of said at least three lenses facing said aperture stop, n is a refractive index of said second lens, R4/[f×(n−1)] is a ratio of a focal length of said surface of said second lens facing said aperture stop to said focal length of said system, $C_2$ is a power phase coefficient of a phase function of said diffraction grating, and $R_n$ is a normalization radius of said diffraction grating.

16. The image pick-up system in accordance with claim 15, wherein said at least three lenses are made of same plastic material.

17. An image pick-up system comprising, from an object side to an image side:
an aperture stop;
a biconvex first lens;
a second lens having a concave surface facing the object side; and
a third lens having a concave surface facing the image side;
wherein the aperture stop and the first, second and third lenses are aligned in that order, the first, second and third lenses are made from essentially the same material, the first lens has a diffraction grating formed on a convex surface thereof that faces the image side, and the following condition is satisfied:

$$-470 < C_2 \times (f1/R_n^2) < -280,$$

wherein, f1 is a focal length of the first lens, $C_2$ is a power phase coefficient of a phase function of the diffraction grating, and $R_n$ is a normalization radius of the diffraction grating.

18. The image pick-up system in accordance with claim 17, wherein the following condition is also satisfied:

$$-9 < f3/f < -1.7,$$

wherein f2 is a focal length of the third lens, and f is a focal length of the lens system.

* * * * *